(12) United States Patent
Meng (10) Patent No.: US 8,390,575 B2
(45) Date of Patent: Mar. 5, 2013

(54) TOUCH-SENSITIVE LIQUID CRYSTAL DISPLAY PANEL WITH BUILT-IN TOUCH MECHANISM AND METHOD FOR DRIVING SAME

(75) Inventor: Kai Meng, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 1120 days.

(21) Appl. No.: 11/986,937

(22) Filed: Nov. 26, 2007

(65) Prior Publication Data

US 2008/0122800 A1  May 29, 2008

(30) Foreign Application Priority Data

Nov. 24, 2006  (CN) .......................... 2006 1 0157041

(51) Int. Cl.
- *G06F 3/041* (2006.01)
- *G02F 1/1335* (2006.01)
- *G02F 1/1339* (2006.01)
- *G09G 3/36* (2006.01)

(52) U.S. Cl. ........... 345/173; 345/104; 349/12; 349/157

(58) Field of Classification Search .................. 345/104, 345/173; 349/12, 157

See application file for complete search history.

(56) References Cited

U.S. PATENT DOCUMENTS

| 4,700,022 A | * | 10/1987 | Salvador et al. | ........... 178/20.03 |
|---|---|---|---|---|
| 6,501,529 B1 | * | 12/2002 | Kurihara et al. | .............. 349/160 |
| 6,538,706 B2 | | 3/2003 | Sun | |
| 7,053,968 B2 | * | 5/2006 | Hong et al. | ..................... 349/12 |
| 7,056,603 B2 | * | 6/2006 | Yoshikawa et al. | ........... 428/698 |
| 7,109,978 B2 | * | 9/2006 | Gillespie et al. | .............. 345/173 |
| 2005/0146509 A1 | * | 7/2005 | Geaghan et al. | .............. 345/173 |
| 2006/0152500 A1 | * | 7/2006 | Weng | .............................. 345/173 |
| 2006/0262100 A1 | * | 11/2006 | Van Berkel | .................... 345/173 |
| 2007/0262967 A1 | * | 11/2007 | Rho | ............................... 345/173 |

FOREIGN PATENT DOCUMENTS

| TW | I258708 B | 7/2006 |
|---|---|---|
| TW | 200636644 A | 10/2006 |

\* cited by examiner

*Primary Examiner* — Alexander Eisen
*Assistant Examiner* — Mark Regn
(74) *Attorney, Agent, or Firm* — WPAT PC; Justin King (57) ABSTRACT

An exemplary touch-sensitive liquid crystal display panel includes a first substrate (21), a second substrate (22) disposed opposite to the first substrate, and a liquid crystal layer (20) interposed between the first substrate and the second substrate. Scan lines (212) and data lines (213) are formed at the first substrate. The scan lines and the data lines cross each other thereby defining pixel regions. Conductive pads (203) are arranged corresponding to and electrically coupled to the scan lines. A conductive layer (280) is arranged between the second substrate and the liquid crystal layer. Conductive protrusions (202) are arranged on the conductive layer, each of the conductive protrusions is opposite to a corresponding conductive pad with a predetermined gap.

16 Claims, 5 Drawing Sheets

TOUCH-SENSITIVE LIQUID CRYSTAL DISPLAY PANEL WITH BUILT-IN TOUCH MECHANISM AND METHOD FOR DRIVING SAME

CROSS-REFERENCE TO RELATED APPLICATION

This application is related to, and claims the benefit of, a foreign priority application filed in China as Ser. No. 200610157041.7 on Nov. 24, 2006. The related application is incorporated herein by reference.

FIELD OF THE INVENTION

The present invention relates to touch-sensitive liquid crystal display (LCD) panels, and particularly to a touch-sensitive LCD panel with a built-in touch-sensitive mechanism and a method for driving the touch-sensitive LCD panel.

BACKGROUND

Currently, various transparent touch panels such as resistance type touch panels, static-electricity-capacity type touch panels and pressure-sensor type touch panels are widely used in different applications. Recently, LCD panels combined with touch panels have become popular in business and entertainment. Generally, an LCD panel having touch panel function is achieved by stacking a transparent touch panel on an LCD panel. A typical such LCD panel includes a built-in light source, i.e. a backlight unit. Light emitting from the backlight unit goes through the LCD panel and the transparent touch panel to display images. The touch panel mounted on the LCD panel acts as an interface or a medium for inputting of signals by a user.

However, the combined touch panel and LCD panel is heavy, since a complete, discrete touch panel is required to be mounted on the LCD panel. In addition, a protection film (or a rubber cushion layer) is usually placed between the touch panel and the LCD panel, in order to reduce quivering between the stacked touch panel and LCD panel. The protection film increases the thickness of the combined touch panel and LCD panel. Furthermore, most touch panels mounted on LCD panels use a PET (polyethylene terephthalate) film for supporting the conducting electrodes of the touch panel and facilitating the sensing of the location of pressure on the touch panel screen. The PET film reflects and absorbs light, whereby a brightness of the combined touch panel and LCD panel is reduced.

Accordingly, what is needed is a touch-sensitive LCD panel that can overcome the above-described deficiencies.

SUMMARY

In one embodiment, a touch-sensitive liquid crystal display panel includes a first substrate, a second substrate disposed parallel to the first substrate, and a liquid crystal layer interposed between the first substrate and the second substrate. A plurality of scan lines and a plurality of data lines are formed at the first substrate, the scan lines and the data lines cross each other thereby defining a plurality of pixel regions. A plurality of conductive pads are arranged corresponding to and electrically coupled to the scan lines. A conductive layer is arranged between the second substrate and the liquid crystal layer. A plurality of conductive protrusions are arranged on the conductive layer, each of the conductive protrusions is opposite to and spaced a predetermined distance from a corresponding conductive pad.

In another embodiment, a method for driving a touch-sensitive liquid crystal display panel is provided. The method includes: providing a first substrate, a second substrate disposed opposite to the first substrate, and a liquid crystal layer interposed between the first substrate and the second substrate; providing a plurality of scan lines and a plurality of data lines formed at the first substrate, the scan lines and the data lines crossing each other thereby defining a plurality of pixel regions; providing a plurality of conductive pads arranged corresponding to and electrically coupled to the scan lines; providing a plurality of parallel resistance lines arranged between the second substrate and the liquid crystal layer, each resistance line being parallel and generally opposite to a corresponding scan line, respectively; providing a plurality of conductive protrusions connecting with the resistance lines, each of the conductive protrusions being generally opposite to and spaced a predetermined distance from a corresponding conductive pad; electrically connecting a conductive protrusion to a corresponding opposite conductive pad at a touch point, a corresponding resistance line connecting with the conductive protrusion obtaining a scanning signal of a scan line connected to the conductive pad, the scanning signal comprising a scanning voltage and a scanning time of the scan line, the touch point dividing the resistance line into two parts, each part of the resistance line receiving part of the scanning voltage, the voltage on each part of the resistance line being proportional to a length of that part of the resistance line; obtaining a first Cartesian coordinate of the touch point in a first direction perpendicular to each of the scan lines according to the scanning time of the scan line; and calculating a second Cartesian coordinate of the touch point in a second direction parallel to each of the scan lines according to the voltages of the two parts of the resistance line.

In still another embodiment, another method for driving a touch-sensitive liquid crystal display panel is provided. The method includes: providing a first substrate, a second substrate disposed opposite to the first substrate, and a liquid crystal layer interposed between the first substrate and the second substrate; providing a plurality of scan lines and a plurality of data lines formed at the first substrate, the scan lines and the data lines crossing each other thereby defining a plurality of pixel regions; providing a plurality of conductive pads arranged corresponding to and electrically coupled to the scan lines; providing a plurality of parallel resistance lines arranged between the second substrate and the liquid crystal layer, the resistance lines being parallel and generally diagonally opposite to the data lines, each of the resistance lines defining a coordinate in a second direction, the second direction being parallel to the scan lines; and providing a plurality of conductive protrusions arranged on the conductive layer, each of the conductive protrusions being generally opposite to and spaced a predetermined distance from a corresponding conductive pad; electrically connecting a conductive protrusion to a corresponding opposite conductive pad at a touch point, a resistance line connected to the conductive protrusion detecting a scanning signal of a scan line connected to the conductive pad, the scanning signal comprising a scanning voltage and a scanning time; checking the scanning time to confirm a first coordinate of the touch point in a first direction perpendicular to the scan lines; and continuously measuring a voltage on each of the resistance lines, a change in voltage on a resistance line indicating the touch point is over the resistance line, the coordinate defined by the resistance line being a second coordinate of the touch point in the second direction parallel to the scan lines.

In one still another embodiment, a touch-sensitive display device, comprising: a first substrate; a second substrate disposed parallel to the first substrate; a voltage being provided between the first and the second substrates for realizing an image display; a plurality of scan lines and a plurality of data lines formed at the first substrate, the scan lines and the data lines crossing each other thereby defining a plurality of pixel regions; a plurality of conductive pads arranged corresponding to and electrically coupled to the scan lines; a conductive layer arranged on an inner surface of the second substrate; a plurality of conductive protrusions arranged on the conductive layer, each of the conductive protrusions being generally opposite to and spaced a predetermined distance from a corresponding conductive pad.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
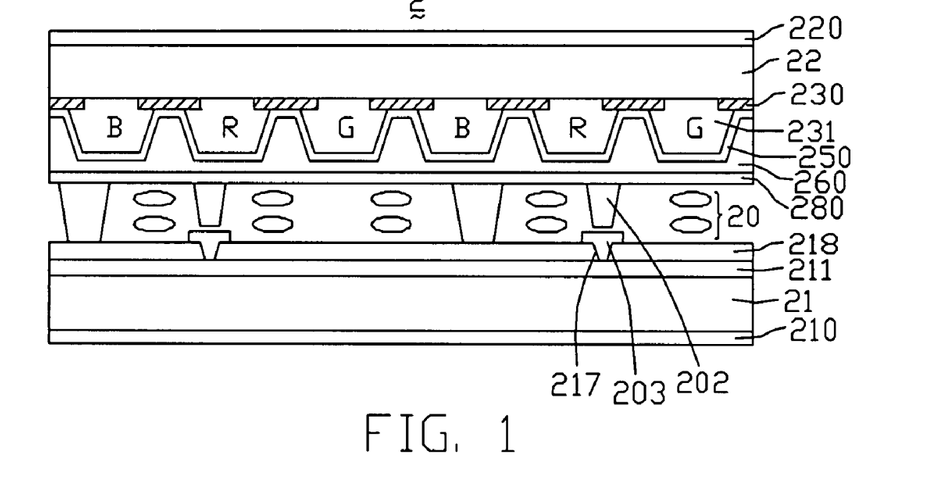
FIG. 1 is a side cross-sectional view of part of a touch-sensitive LCD panel according to a first embodiment of the present invention, the touch-sensitive LCD panel including a first substrate and a second substrate.

FIG. 1 is a side cross-sectional view of a touch-sensitive LCD panel according to a first embodiment of the present invention. The touch-sensitive LCD panel 2 includes a first substrate 21, a second substrate 22 disposed parallel and generally opposite to the first substrate 21 a predetermined distance away, and a liquid crystal layer 20 interposed between the first substrate 21 and the second substrate 22.

A first polarizer 210 is arranged at an outer surface of the first substrate 21. An electrode layer 211 and a first insulating layer 218 are sequentially arranged on an inner surface of the first substrate 21. A plurality of contact holes 217 are formed through the first insulating layer 218. A plurality of conductive pads 203 are arranged on the first insulating layer 218 in the plurality of contact holes 217. The plurality of conductive pads 203 are electrically connected to the electrode layer 211 at bottoms of the plurality of contact holes 217, respectively. The conductive pads 203 can be made of ITO (indium tin oxide).

A second polarizer 220 is arranged at an outer surface of the second substrate 22. A black matrix 230, a color filter 231, a common electrode layer 250, a second insulating layer 260, and a conductive layer 280 are arranged on an inner surface of the second substrate 22, in that order from top to bottom. A plurality of conductive protrusions 202 are arranged on the conductive layer 280, generally opposite and corresponding to the plurality of conductive pads 203. Each of the conductive protrusions 202 is located a predetermined distance from the corresponding conductive pad 203.

Figure 2:
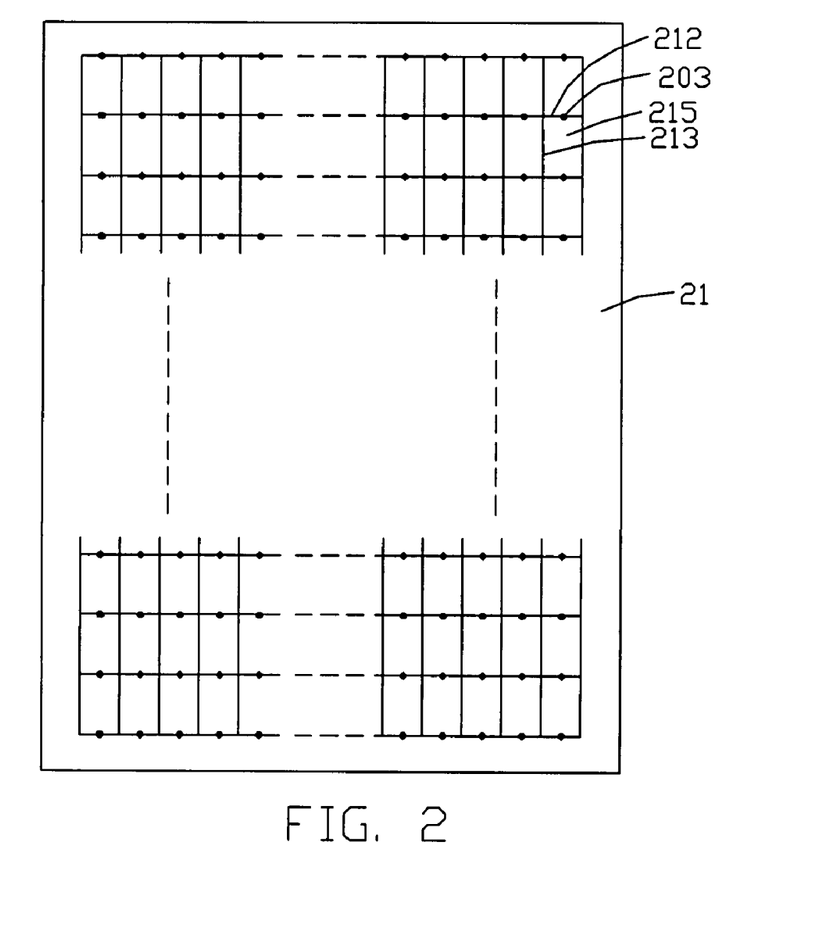
FIG. 2 is an abbreviated top plan view of the first substrate of the touch-sensitive LCD panel of the first embodiment.

Also referring to FIG. 2, a top plan view of the first substrate 21 is shown. The electrode layer 211 includes a multiplicity of data lines 213 and a multiplicity of scan lines 212. The data lines 213 are arranged parallel to each other, and each data line 213 extends along a longitudinal (vertical) direction. The scan lines 212 are arranged parallel to each other, and each scan line 212 extends along a transverse (horizontal) direction. Thus, the crossing data lines 213 and scan lines 212 cooperatively define a multiplicity of pixel regions 215.

The contact holes 217 are arranged right above the scan lines 212, and each of the conductive pads 203 is electrically connected to a corresponding scan line 212 via a corresponding contact hole 217. In this embodiment, the number of conductive pads 203 is equal to the number of pixel regions 215. Each conductive pad 203 is located corresponding to one respective pixel region 215.

Figure 3:
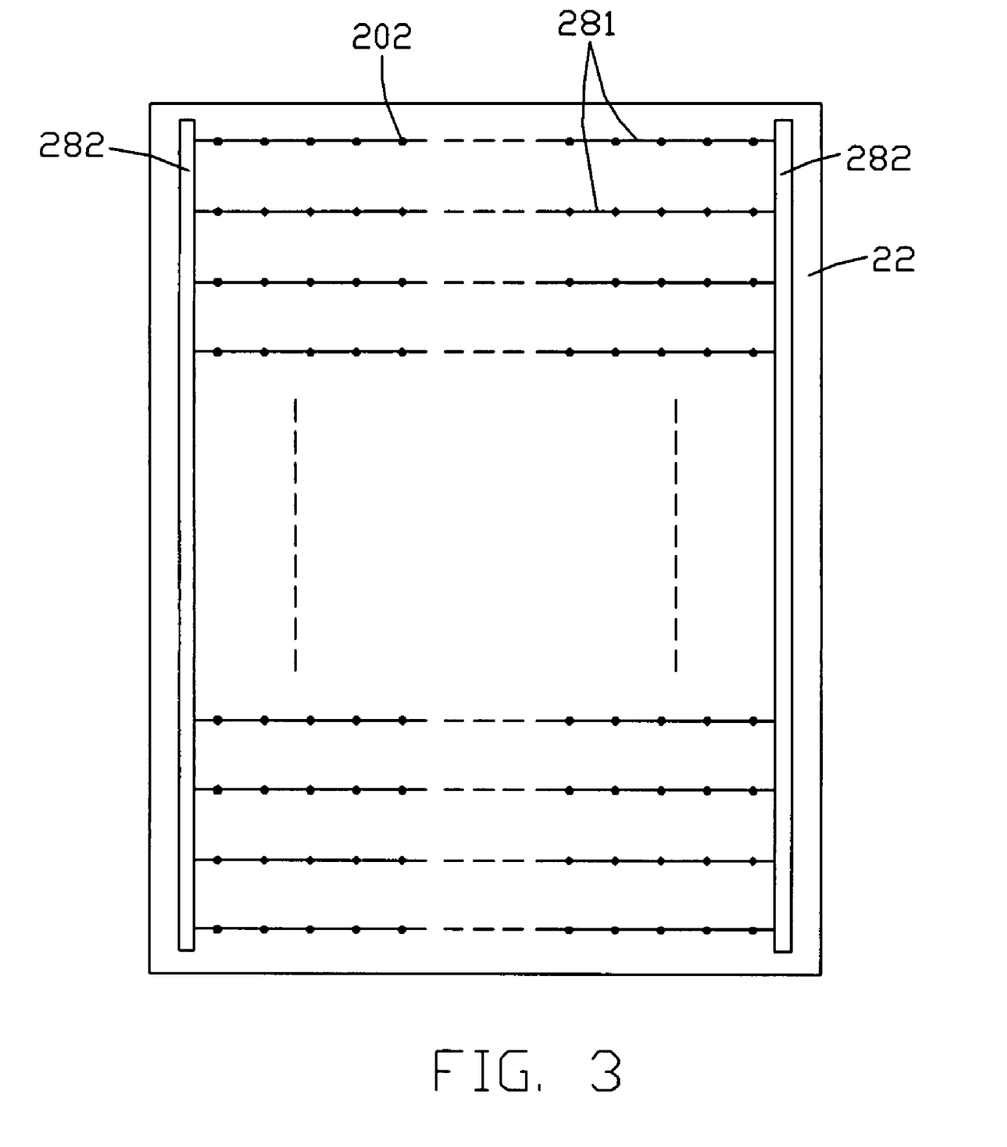
FIG. 3 is an abbreviated, top plan view of the second substrate of the touch-sensitive LCD panel of the first embodiment.

Also referring to FIG. 3, a top plan view of the second substrate 22 is shown. The conductive layer 280 includes a plurality of parallel resistance lines 281 and two electrode bars 282. The resistance lines 281 and the two electrode bars 282 cooperatively function as a touch-sensing mechanism. The resistance lines 281 are arranged corresponding to the black matrix 230. Therefore, light reflection, refraction, and absorption caused by the plurality of resistance lines 281 only occur at regions corresponding to the black matrix 230. This means the resistance lines 281 interfere little with the displaying of images on the touch-sensitive LCD panel 2. The resistance lines 281 are parallel and generally opposite to the scan lines 212 of the first substrate 21, respectively. A resistance of each resistance line 281 is proportional to a length of that part of the resistance line. The resistance lines 281 can be made of indium tin oxide (ITO) film. The two electrode bars 282 perpendicularly cross two opposite ends of each of the resistance lines 281. The electrode bars 282 are made of conductive material with low resistivity, such as silver or copper. Thereby, attenuation of electrical signals transmitted by the electrode bars 282 can be as low as possible. Each of the electrode bars 282 may have a wide striped structure. The wide striped structure helps reduce the attenuation of the electrical signals transmitted in the electrode bar 282.

The plurality of conductive protrusions 202 are arranged at the resistance lines 281, with each conductive protrusion 202 being electrically connected to a corresponding resistance line 281. Each conductive protrusion 202 is located the predetermined distance from the corresponding conductive pad 203. The conductive protrusions 202 and corresponding conductive pads 203 are insulated from each other by the liquid crystal layer 20 therebetween. However, when the second substrate 22 is pressed and bent toward the first substrate 21, at least one conductive protrusion 202 electrically contacts the corresponding at least one conductive pad 203. Accordingly, scanning signals of the scan line 212 can be transmitted to the resistance lines 281.

Figure 4:
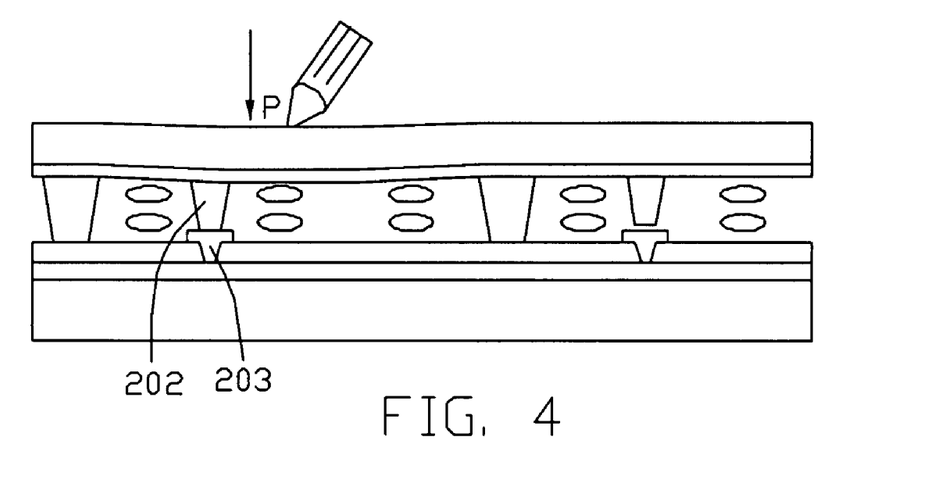
FIG. 4 is a simplified, side cross-sectional view of part of the touch-sensitive LCD panel of the first embodiment, showing the touch-sensitive LCD panel being touched by a stylus.
Figure 5:
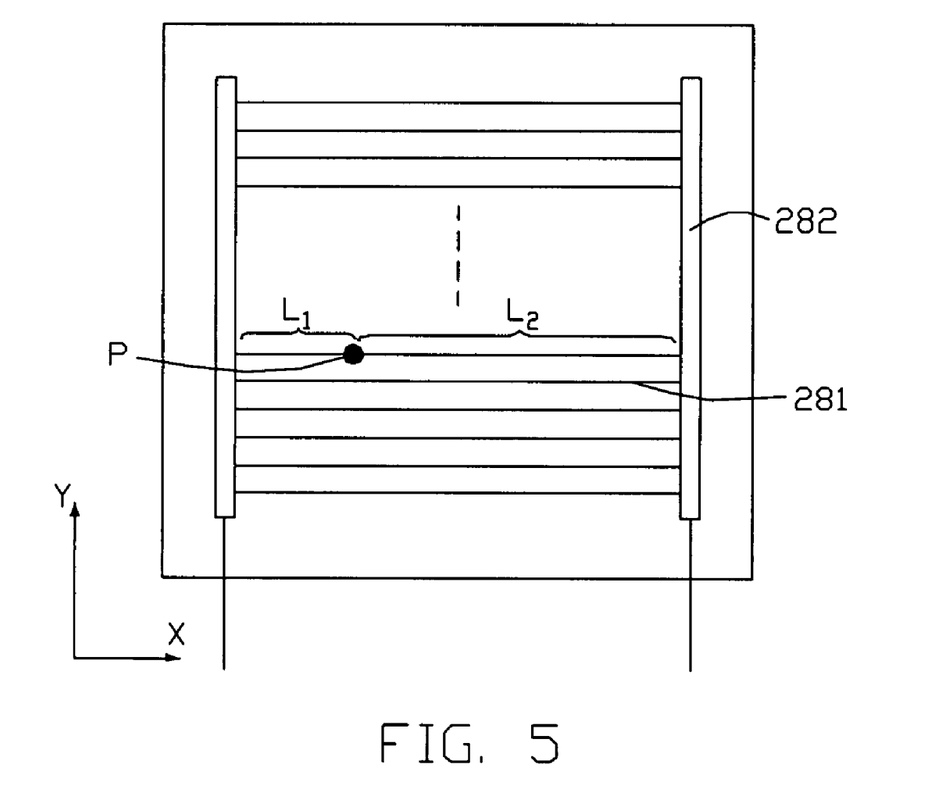
FIG. 5 is a simplified, abbreviated, top plan view of the second substrate of the touch-sensitive LCD panel of the first embodiment, showing an operating principle for confirming a touch location on the touch-sensitive LCD panel.

FIG. 4 and FIG. 5 illustrate aspects of operation of the touch-sensitive LCD panel 2 when the touch-sensitive LCD panel 2 is touched by a stylus. In a rectangular Cartesian coordinate system (x, y) as shown in FIG. 5, each of the scan lines 212 extends parallel to the X-axis. That is, each of the scan lines 212 defines a Y-coordinate. Each of the data lines 213 extends parallel to the Y-axis.

When a stylus touches and presses the touch-sensitive LCD panel 2 at a touch point "P" of the second substrate 22, part of the second substrate 22 bends toward the first substrate 21, and at least one conductive protrusion 202 is electrically connected to the corresponding at least one conductive pad 203. Then a scanning signal of the scan line 212 transmits to the corresponding resistance line 281 via the conductive pad 203 and the conductive protrusion 202. The scanning signal includes a scanning voltage and a scanning time of the scan line 212. Then the scanning signal transmits to other elements (such as a controller, not shown) of the touch-sensitive LCD panel 2 via the electrode bars 282.

Generally, the scan lines 212 are scanned by a scan driver (not shown), and the scan driver has an independent scanning time sequence. The scanning time sequence defines a plurality of scanning times of each of the scan lines 212. The scanning time sequence functions as a reference, and each scanning time of the scanning lines 212 has a logic address in the reference. Each logic address maps a respective physical address of each of the scan lines 212. The controller compares the scanning time of the scan line 212 with the scanning time sequence of the scan driver to confirm the logic position of the scanning time. According to the mapping relation of each logic address to the corresponding physical address, the physical address of the scan line 212 may be defined. Thus, the scan line 212 where the touch point "P" is located is confirmed. Accordingly, a Y-coordinate defined by the scan line 212 is also a Y-coordinate of the touch point "P".

The resistance line 281 is divided into two parts by the touch point "P". The two parts have respective lengths of $L_1$ and $L_2$, with corresponding resistances of $R_1$ and $R_2$. The scanning voltage of the scanning signal of the scan line 212 is distributed at the two parts with voltages of $U_1$ and $U_2$, respectively. The voltages $U_1$ and $U_2$ can be expressed according to the following equation:

$$U_1/U_2 = R_1/R_2 \quad (1)$$

Because of the proportional relation between the resistance and the length of the resistance line 281, the resistances R1 and R2 can be expressed according to the following equation:

$$R_1/R_2 = L_1/L_2 \quad (2)$$

Thus $L_1/L_2$ can be expressed according to the following equation:

$$L_1/L_2 = U_1/U_2 \quad (3)$$

The voltages $U_1$ and $U_2$ are transmitted to the controller, and then the controller calculates a value of U1/U2. According to the above equation (3), a value of $L_1/L_2$ is obtained. According to the value of $L_1/L_2$, a location of the touch point "P" along the resistance line 281 can be determined. That is, an X-coordinate of the touch point "P" can be obtained.

By the above-described method, precise coordinates (x, y) of the touch point "P" are obtained.

In summary, the touch-sensitive LCD panel 2 has a built-in touch-sensitive mechanism. Therefore the touch-sensitive LCD panel 2 has both the function of an LCD and the function of a touch panel. This circumvents the problem in conventional art whereby a separate touch panel needs to be stacked on an LCD panel. Accordingly, the touch-sensitive LCD panel 2 is lightweight and thin. Furthermore, the additional protective PET film typically required in the conventional art is not needed for the touch-sensitive LCD panel 2, and the reflection and absorption of light caused by such film is eliminated. Thus, the touch-sensitive LCD panel 2 has higher light transmittance and improved brightness.

Figure 6:
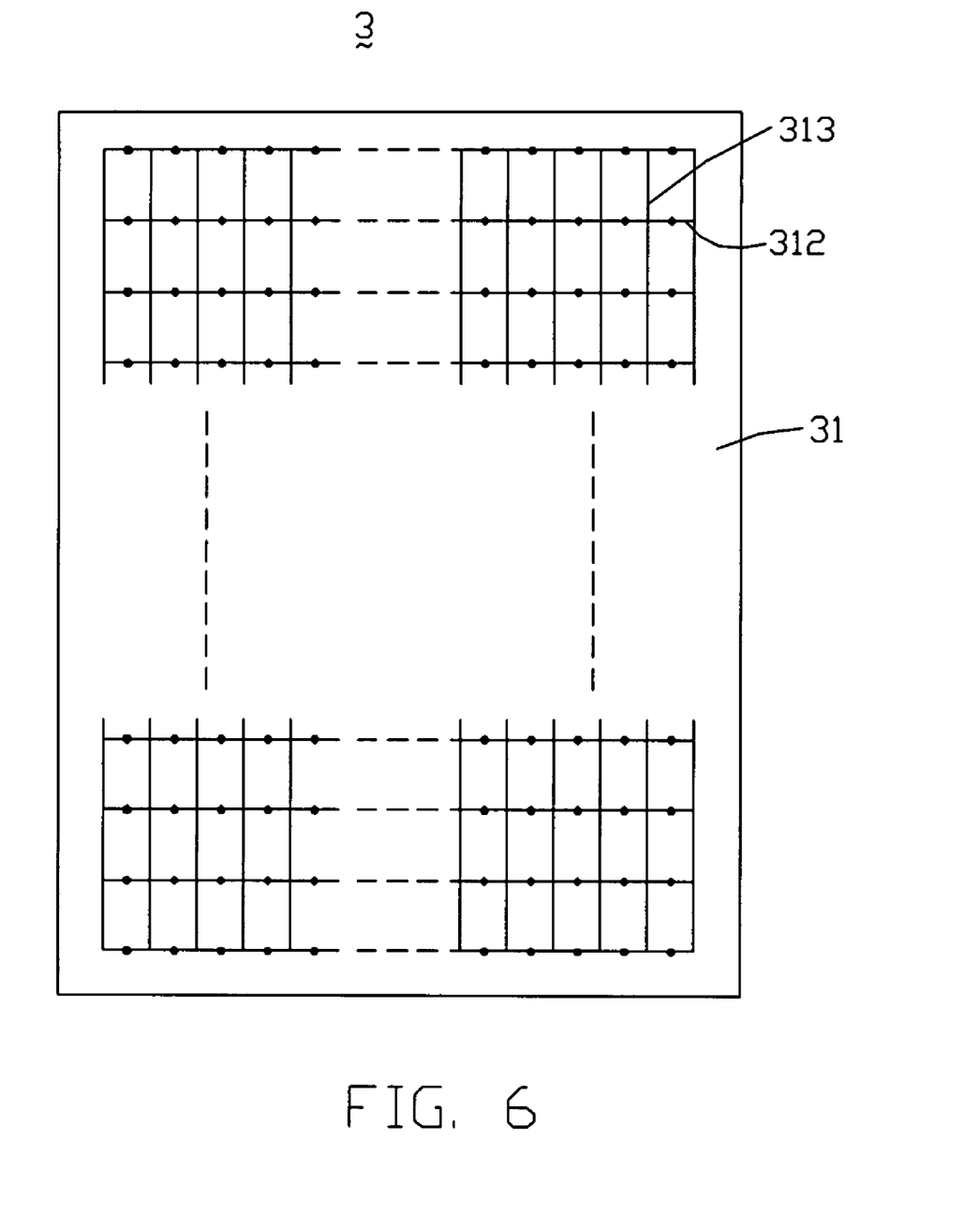
FIG. 6 is an abbreviated, top plan view of a first substrate of a touch-sensitive LCD panel according to a second embodiment of the present invention.
Figure 7:
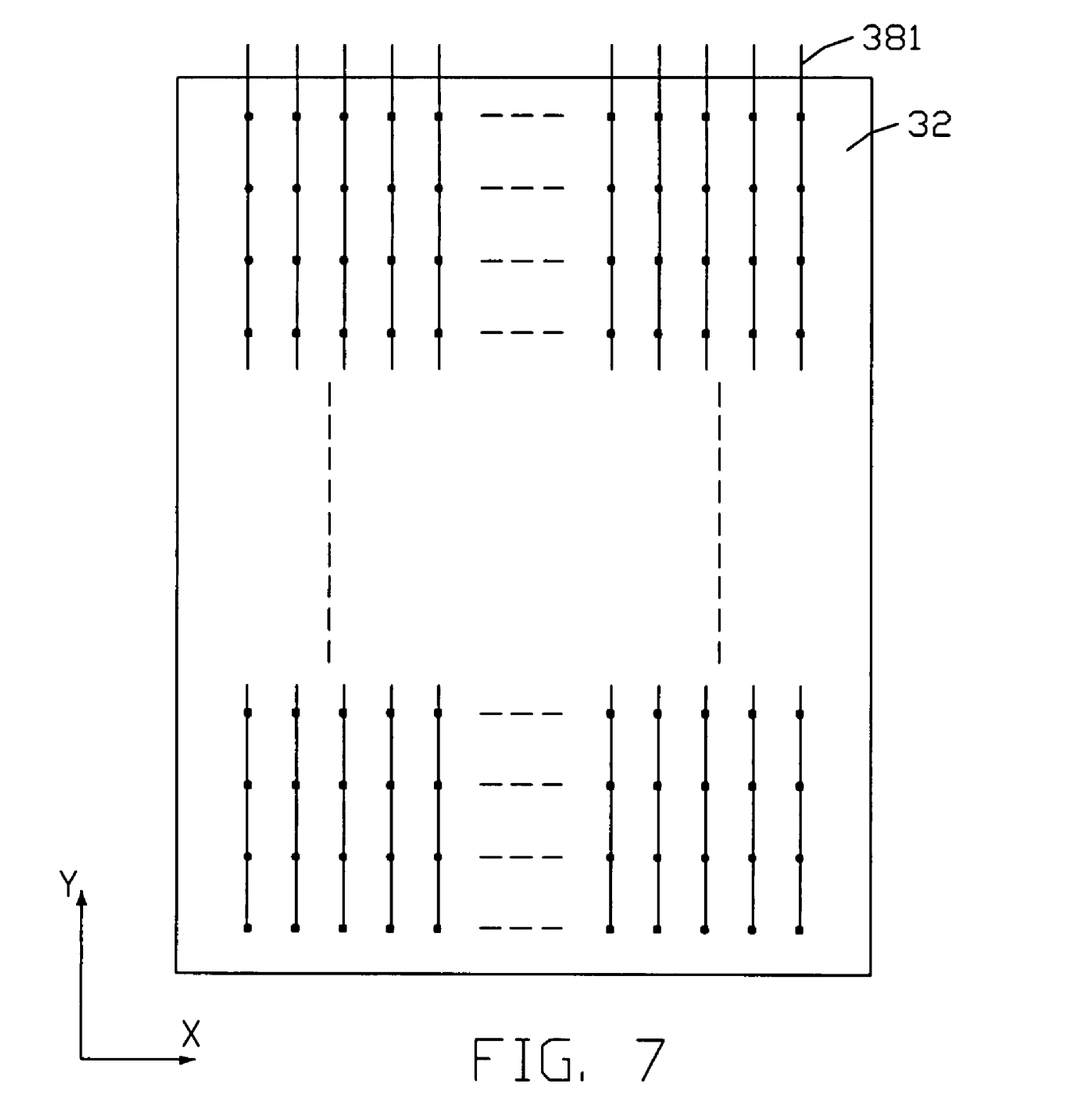
FIG. 7 is an abbreviated, top plan view of a second substrate of the touch-sensitive LCD panel according to the second embodiment.

FIG. 6 and FIG. 7 show top plan views of a first substrate 31 and a second substrate 32 of a touch-sensitive LCD panel 3 according to a second embodiment of the present invention. The touch-sensitive LCD panel 3 has a structure similar to that of the touch-sensitive LCD panel 2. However, a plurality of parallel resistance lines 381 on a second substrate 32 are parallel and generally diagonally opposite to a plurality of data lines 313 on the first substrate 31, respectively. That is, when the touch-sensitive LCD panel 3 is viewed from above, the resistance lines 381 of the second substrate 32 are parallel to and alternately arranged relative to the data lines 313 of the first substrate 31. As shown in FIG. 7, each of the resistance lines 381 extends parallel to a Y-axis of a rectangular Cartesian coordinate system (x, y), and perpendicularly crosses a point of an X-axis. Therefore, each resistance line 381 defines an X-coordinate. The plurality of resistance lines 381 are all separately arranged, and an end of each resistance line 381 is connected to a controller (not shown).

When a point of the LCD panel 3 is touched by a stylus, one of the resistance lines 381 is electrically connected to a corresponding scan line 312. A scanning signal of the scan line 312 is obtained by the resistance line 381. The scanning signal includes at least one scanning voltage of the scan line 312, and the scanning voltage is transmitted to the controller. Accordingly, a voltage of the resistance line 381 is changed by the scan signal.

Simultaneously, the controller continuously measures a voltage of each resistance line 381. A change in voltage of a resistance line 381 indicates that the resistance line 381 has been connected to the corresponding scan line 312. That is, a touch occurs over the resistance line 381. The resistance line 381 has a defined X-coordinate, and the X-coordinate is also an X-coordinate of the touch point. Thus, the X-coordinate of the touch point is obtained. A method for obtaining a Y-coordinate of the touch point is the same as that of the touch-sensitive LCD panel 2. According to the methods described above, precise coordinates (x, y) of the touch point can be obtained.

It is to be further understood that even though numerous characteristics and advantages of various embodiments have been set forth in the foregoing description, together with details of the structures and functions of the embodiments, the disclosure is illustrative only, and changes may be made in detail to the full extent indicated by the broad general meaning of the terms in which the appended claims are expressed.

What is claimed is:

1. A touch-sensitive liquid crystal display panel, comprising:
   a first substrate;
   a second substrate disposed parallel to the first substrate;
   a liquid crystal layer interposed between the first substrate and the second substrate;
   a plurality of scan lines and a plurality of data lines formed at the first substrate, the scan lines and the data lines crossing each other thereby defining a plurality of pixel regions;
   a first insulating layer covering the data lines and the scan lines, the first insulating layer defining a plurality of contact holes therethrough, the contact holes being right above the plurality of scan lines;

a plurality of conductive pads arranged on the first insulating layer and in the plurality of contact holes, each of the plurality of conductive pads electrically connected to a corresponding scan line via a corresponding contact hole;

a conductive layer arranged between the second substrate and the liquid crystal layer, the conductive layer comprising a plurality of parallel resistance lines, the plurality of parallel resistance lines being parallel and opposite to the scan lines, correspondingly; and a plurality of conductive protrusions arranged on the plurality of parallel resistance lines, each of the conductive protrusions connects to the conductive layer and being generally opposite to and spaced a predetermined distance from a corresponding conductive pad.

2. The touch-sensitive liquid crystal display panel as claimed in claim 1, further comprising two electrode bars, the two electrode bars arranged at two ends of the plurality of parallel resistance lines to transmit electrical signals on the plurality of parallel resistance line, wherein when a given conductive protrusion and a corresponding opposite conductive pad are electrically connected at a touch point, a scanning signal of a corresponding scan line transmits to the two electrode bars of the conductive layer, and the touch-sensitive display device analyzes the scanning signal to obtain a coordinate of the touch point.

3. The touch-sensitive liquid crystal display panel as claimed in claim 2, wherein the scanning signal comprises a scanning voltage and a scanning time sequence of a corresponding scan line.

4. The touch-sensitive liquid crystal display panel as claimed in claim 2, wherein the two electrode bars are made of silver.

5. The touch-sensitive liquid crystal display panel as claimed in claim 1, wherein each conductive protrusion and corresponding opposite conductive pad are arranged corresponding to one respective pixel region.

6. The touch-sensitive liquid crystal display panel as claimed in claim 1, further comprising a black matrix, a color filter, a common electrode layer, and a second insulating layer arranged between the second substrate and the plurality of parallel resistance lines in that order from top to bottom, the plurality of parallel resistance lines being arranged corresponding to the black matrix.

7. The touch-sensitive liquid crystal display panel as claimed in claim 1, wherein a resistance of any part of each one of the plurality of parallel resistance lines is proportional to a length of that part of each one of the plurality of parallel resistance lines.

8. The touch-sensitive liquid crystal display panel as claimed in claim 1, wherein the plurality of parallel resistance lines are parallel and generally diagonally opposite to the plurality of data lines, respectively, and each of the plurality of parallel resistance lines defines a coordinate in a direction along the scan lines.

9. The touch-sensitive liquid crystal display panel as claimed in claim 1, wherein the plurality of parallel resistance lines are made of indium tin oxide.

10. The touch-sensitive liquid crystal display panel as claimed in claim 1, wherein the number of conductive pads is equal to the number of pixel regions.

11. A method for driving a touch-sensitive liquid crystal display panel, the method comprising:
providing a first substrate;
providing a second substrate parallel to the first substrate;
providing a liquid crystal layer interposed between the first substrate and the second substrate;
providing a plurality of scan lines and a plurality of data lines formed at the first substrate, the scan lines and the data lines crossing each other thereby defining a plurality of pixel regions;
providing a first insulating layer covering the data lines and the scan lines, the first insulating layer defining a plurality of contact holes therethrough, the contact holes being right above the plurality of scan lines;
providing a plurality of conductive pads arranged on the first insulating layer and in the plurality of contact holes, each of the plurality of conductive pads is electrically connected to a corresponding scan line via a corresponding contact hole;
providing a plurality of parallel resistance lines arranged between the second substrate and the liquid crystal layer, each resistance line being parallel and generally opposite to a respective scan line;
providing a plurality of conductive protrusions connecting with the resistance lines, each of the conductive protrusions connects to the conductive layer and being generally opposite to and spaced a predetermined distance from a corresponding conductive pad;
electrically connecting a conductive protrusion to a corresponding opposite conductive pad at a touch point, a corresponding resistance line connecting with the conductive protrusion obtaining a scanning signal of a scan line connected to the conductive pad, the scanning signal comprising a scanning voltage and a scanning time of the scan line, the touch point dividing the resistance line into two parts, each part of the resistance line receiving part of the scanning voltage, the voltage on each part of the resistance line being proportional to a length of that part of the resistance line;
obtaining a first Cartesian coordinate of the touch point in a first direction perpendicular to each of the scan lines according to the scanning time of the scan line; and
calculating a second Cartesian coordinate of the touch point in a second direction parallel to each of the scan lines according to the voltages of the two parts of the resistance line.

12. The method for driving a touch-sensitive liquid crystal display panel as claimed in claim 11, further comprising providing two electrode bars arranged at two ends of the resistance lines to transmit electrical signals of the resistance lines.

13. The method for driving a touch-sensitive liquid crystal display panel as claimed in claim 11, wherein a resistance of any part of each resistance line is proportional to a length of that part of the resistance line.

14. The touch-sensitive liquid crystal display panel as claimed in claim 11, the method further providing two electrode bars arranged at two ends of the plurality of parallel resistance lines to transmit electrical signals on the plurality of parallel resistance lines.

15. A method for driving a touch-sensitive liquid crystal display panel, the method comprising:
providing a first substrate;
providing a second substrate parallel to the first substrate;
providing a liquid crystal layer interposed between the first substrate and the second substrate;
providing a plurality of scan lines and a plurality of data lines formed at the first substrate, the scan lines and the data lines crossing each other thereby defining a plurality of pixel regions;
providing a first insulating layer covering the data lines and the scan lines, the first insulating layer defining a plurality of contact holes therethrough, the contact holes being right above the plurality of scan lines;

providing a plurality of conductive pads arranged on the first insulating layer and in the plurality of contact holes, each of the plurality of conductive pads is electrically connected to a corresponding scan line via a corresponding contact hole;

providing a plurality of parallel resistance lines arranged between the second substrate and the liquid crystal layer, the resistance lines being parallel and generally diagonally opposite to the data lines, each of the resistance lines defining a coordinate in a second direction, the second direction being parallel to the scan lines;

providing a plurality of conductive protrusions arranged on the conductive layer, each of the conductive protrusions connects to the conductive layer and being generally opposite to and spaced a predetermined distance from a corresponding conductive pad;

electrically connecting a conductive protrusion to a corresponding opposite conductive pad at a touch point, one of the plurality of parallel resistance lines connected to the conductive protrusion detecting a scanning signal of one of the plurality of scan lines connected to the corresponding conductive pad, the scanning signal comprising a scanning voltage and a scanning time;

checking the scanning time to confirm a first coordinate of the touch point in a first direction perpendicular to the plurality of scan lines; and continuously measuring a voltage on each one of the plurality of parallel resistance lines, a change in voltage on one of the plurality of parallel resistance lines indicating the touch point is over the one of the plurality of parallel resistance lines, the coordinate defined by the one of the plurality of parallel resistance lines being a second coordinate of the touch point in the second direction parallel to the scan lines.

16. The tough-sensitive liquid crystal display panel as claimed in claim 15, the method further providing two electrode bars arranged at two ends of the plurality of parallel resistance lines to transmit electrical signals on the plurality of parallel resistance lines.

* * * * *